(12) United States Patent
Tarameshloo et al.

(10) Patent No.: US 11,115,439 B2
(45) Date of Patent: Sep. 7, 2021

(54) AUTOMATED SECURITY SOLUTIONS IDENTIFICATION AND ARCHITECTURE DESIGN

(71) Applicant: Accenture Global Solutions Limited, Dublin (IE)

(72) Inventors: Ebrahim Tarameshloo, Toronto (CA); Amin Hassanzadeh, Arlington, VA (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 290 days.

(21) Appl. No.: 16/275,953

(22) Filed: Feb. 14, 2019

(65) Prior Publication Data
US 2020/0267186 A1    Aug. 20, 2020

(51) Int. Cl.
*H04L 29/06*        (2006.01)
*G06N 20/00*        (2019.01)

(52) U.S. Cl.
CPC .......... *H04L 63/20* (2013.01); *G06N 20/00* (2019.01)

(58) Field of Classification Search
None
See application file for complete search history.

(56) References Cited

U.S. PATENT DOCUMENTS

2020/0259864 A1\* 8/2020 Softer .................. H04L 63/102

\* cited by examiner

*Primary Examiner* — Cai Y Chen
(74) *Attorney, Agent, or Firm* — Jordan IP Law, LLC

(57) ABSTRACT

Systems, apparatuses, and methods directed to security enhancement. One or more remote data sources may be accessed to retrieve remote data associated with security for a computing architecture. An input model of an input network security architecture may be identified. One or more user-based constraints may be identified. An output model may be automatically generated based on the input model, the remote data and the one or more user-based constraints. The output model is an output network security architecture that complies with the one or more user-based constraints.

17 Claims, 8 Drawing Sheets

AUTOMATED SECURITY SOLUTIONS IDENTIFICATION AND ARCHITECTURE DESIGN

FIELD OF THE DISCLOSURE

This disclosure generally relates to methods, systems, apparatuses, and computer readable media for automated security architecture development and updates based on constraints.

BACKGROUND

Cyber security has become an important consideration for any network (e.g., an organization's network). Unsecured networks may suffer from massive data breaches compromising sensitive data as well as consumer confidence. Implementing security solutions on a large scale however may be cumbersome, difficult, involve high latency, and be prone to errors. For example, some enterprises may have thousands of computers networked together in various topologies across large geographic regions. Further, in some cases obtaining an accurate schematic or layout of an existing computing architecture may not be possible, as updates are frequently executed in a rapid and decentralized manner. As such, manually identifying weaknesses, and holistically modifying a security architecture for enterprises based on constraints may be impossible for practical purposes.

SUMMARY

Consistent with the disclosure, exemplary embodiments of systems, apparatuses, and methods thereof for generating enhanced security solutions, are disclosed.

According to an embodiment, a security design system, includes an interface to access one or more remote data sources to retrieve remote data associated with security for a computing architecture, and a processor communicatively coupled to the interface. The processor is configured to identify an input model of an input network security architecture, identify one or more user-based constraints, and automatically generate an output model based on the input model, the remote data and the one or more user-based constraints, where the output model represents an output network security architecture that complies with at least one of the one or more user-based constraints.

In an embodiment of the system, the processor is configured to compare the input model and the one or more user-based constraints to previous network security architecture models and previous user-based constraints associated with the previous network security architecture models to identify one or more similar network security architecture models from the previous network security architecture models that are similar to the input model, and automatically generate the output model based on the one or more similar network security architecture models.

In an embodiment of the system, the processor is configured to generate a plurality of different output models based on the input model, the remote data and the one or more user-based constraints, where each of the plurality of different output models represents an output network security architecture that complies with at least one of the one or more user-based constraints.

In an embodiment of the system, the one or more user-based constraints is to include one or more of a cost constraint, a time constraint, a security based constraint or a goal constraint.

In an embodiment of the system, the remote data is to include one or more of hardware specifications, costs of security implementations, time for security implementations, network threat data or webpage data.

In an embodiment of the system, the input model and the output model are each a directed graph.

In an embodiment of the system, the processor is configured to receive an input data structure that corresponds to the input network security architecture, conduct an automated analysis of the input network security architecture to identify one or more missing elements that are part of the input network security architecture and missing from the input data structure, and generate the input model from the input data structure and the automated analysis.

In an embodiment, a method, includes accessing one or more remote data sources to retrieve remote data associated with security for a computing architecture, identifying an input model of an input network security architecture, identifying one or more user-based constraints, and automatically generating an output model based on the input model, the remote data and the one or more user-based constraints, wherein the output model represents an output network security architecture that complies with at least one of the one or more user-based constraints.

In an embodiment of the method, the method may further include comparing the input model and the one or more user-based constraints to previous network security architecture models and previous user-based constraints associated with the previous network security architecture models, based on the comparing, identifying one or more similar network security architecture models from the previous network security architecture models that are similar to the input model, and automatically generating the output model based on the one or more similar network security architecture models.

In an embodiment of the method, the method may further include generating a plurality of different output models based on the input model, the remote data and the one or more user-based constraints, where each of the plurality of different output models represents an output network security architecture that complies with at least one of the one or more user-based constraints.

In an embodiment of the method, the one or more user-based constraints includes one or more of a cost constraint, a time constraint, a security based constraint or a goal constraint.

In an embodiment of the method, the remote data includes one or more of hardware specifications, costs of security implementations, time for security implementations, network threat data or webpage data.

In an embodiment of the method, the input model and the output model are each a directed graph.

In an embodiment, a non-transitory computer readable medium includes a set of instructions, which when executed by one or more processors of an authentication device, cause the one or more processors to retrieve remote data associated with security for a computing architecture, identify an input model of an input network security architecture, identify one or more user-based constraints, and automatically generate an output model based on the input model, the remote data and the one or more user-based constraints, wherein the output model represents an output network security architecture that complies with at least one of the one or more user-based constraints.

In an embodiment of the non-transitory computer readable medium, the one or more processors are to compare the input model and the one or more user-based constraints to previous network security architecture models and previous user-based constraints associated with the previous network security architecture models to identify one or more similar network security architecture models from the previous network security architecture models that are similar to the input model, and automatically generate the output model based on the one or more similar network security architecture models.

In an embodiment of the non-transitory computer readable medium, the one or more processors are to generate a plurality of different output models based on the input model, the remote data and the one or more user-based constraints, wherein each of the plurality of different output models represents an output network security architecture that complies with at least one of the one or more user-based constraints.

In an embodiment of the non-transitory computer readable medium, the one or more user-based constraints is to include one or more of a cost constraint, a time constraint, a security based constraint or a goal constraint.

In an embodiment of the non-transitory computer readable medium, the remote data is to include one or more of hardware specifications, costs of security implementations, time for security implementations, network threat data or webpage data.

In an embodiment of the non-transitory computer readable medium, the input model and the output model are each a directed graph.

In an embodiment of the non-transitory computer readable medium, the one or more processors are to receive an input data structure that corresponds to the input network security architecture, conduct an automated analysis of the input network security architecture to identify one or more missing elements that are part of the input network security architecture and missing from the input data structure, and generate the input model from the input data structure and the automated analysis.

It is to be understood that both the foregoing general description and the following detailed description are exemplary and explanatory only and are not restrictive of the invention, as claimed.

BRIEF DESCRIPTION OF THE DRAWINGS

The various embodiments will become apparent to one skilled in the art by reading the following specification and appended claims, and by referencing the following drawings, in which:

DESCRIPTION OF THE EMBODIMENTS

Figure 1A:
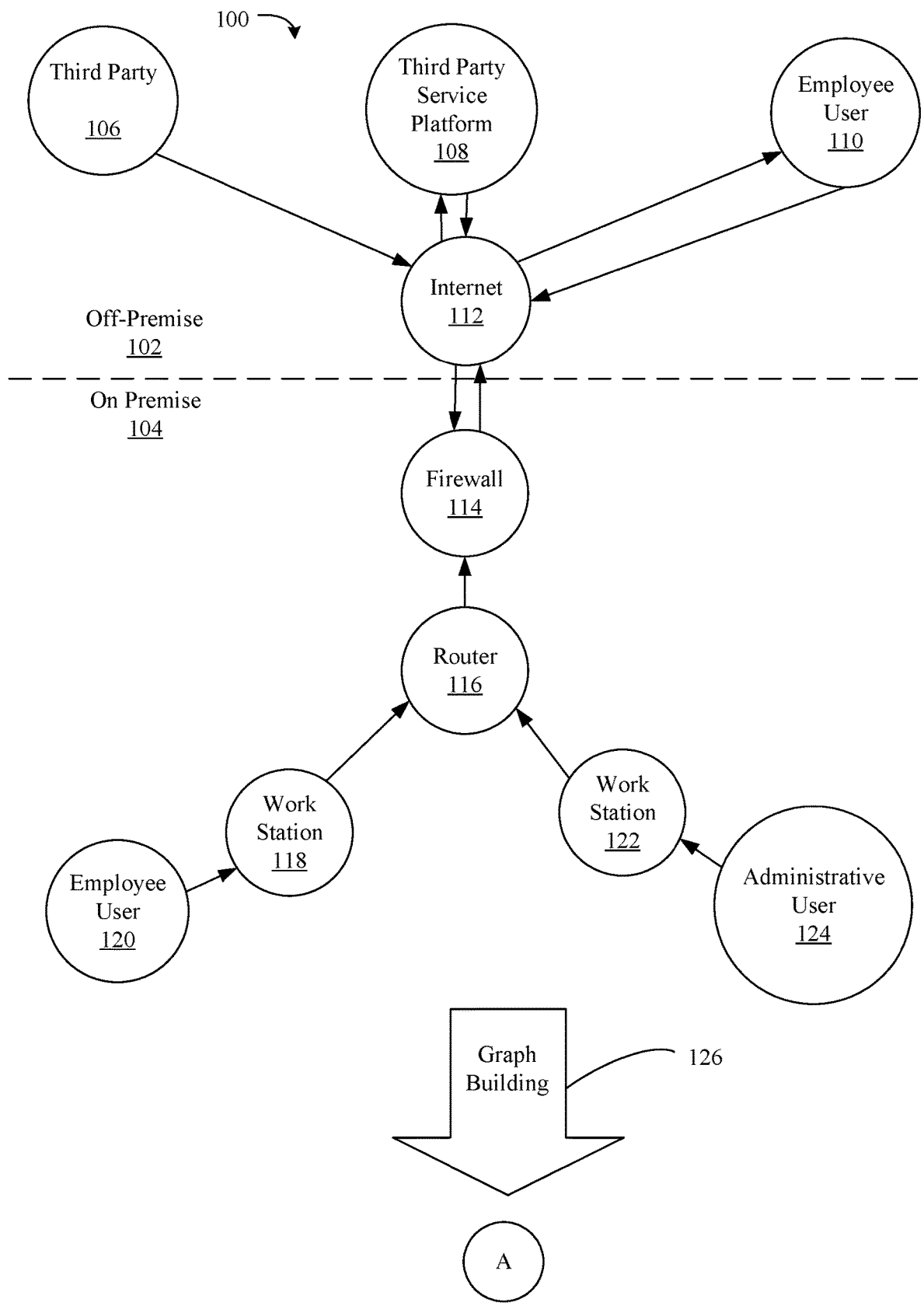
FIGS. 1A, 1B and 1C illustrate a process to generate a security enhanced computing architecture model according to an exemplary embodiment.

While the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," an illustrative embodiment," etc., indicate that the embodiment described may include a particular feature, structure, or characteristic, but every embodiment may or may not necessarily include that particular feature, structure, or characteristic. Further, when a particular feature, structure, or characteristic is described in connection with an embodiment, it is submitted that it is within the knowledge of one skilled in the art to affect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a machine readable (e.g., computer-readable) medium or machine-readable storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Some embodiments may leverage machine intelligence and its powerful computation to design and produce a security architecture that satisfies complex client security requirements. In particular, some embodiments relate to an automated process to enhance a computing architecture. For example, in some embodiments, environmental data may be automatically collected from a computing environment to generate a graph (e.g., a directed graph) of the computing environment. Security data may be collected from third party databases or websites. Constraints (e.g., price, goals, time, etc.) may also be collected. The directed graph may be modified based on the security data and/or the constraints to generate a security enhanced directed graph.

The automated process may result in several technical advantages, including reducing or eliminating errors or miscalculations by mathematically proving that the security enhanced directed graph meets the constraints. For example, a technical implementation of the security enhanced directed graph may be deployed to determine that the security enhanced directed graph meets a security constraint (e.g., wired connections only between critical and/or business nodes). Further, if a goal constraint is to protect a particular business sensitive domain and/or data sensitive domain, penetration test tools may test the domain to determine the strength of the domain, and the domain may be ranked accordingly.

Further yet, the above automated process is far more efficient than any manual process and removes human subjectivity and waste. For example, the automated process may significantly reduce the time needed to generate the security enhanced directed graph. Moreover, the security enhanced directed graph may be generated not just on the isolated knowledge of one architect, but on an entire body of knowledge spread out over various platforms (e.g., previous solution profiles for different architectures, third party web sites, etc.) to incorporate far more security solutions in the security enhanced directed graph and generate a far more robust system than was previously possible. Such a vast body of knowledge may essentially be incomprehensible and underutilized by humans. Thus, human subjectivity (e.g., biased and limited human experiences) may be eliminated by generating security enhancements based on the vast body of knowledge.

Further, several different security enhanced directed graphs may be generated based on the directed graph. A user may select the most preferable security enhanced directed graph to meet their needs. Previously, generating several different security enhanced directed graphs would be far too time consuming, thus limiting security options and reducing flexibility. Thus, some embodiments may enhance security and user choices by allowing several different security enhanced directed graphs to be generated and an ideal security enhanced directed graph to be selected.

Figure 1B:
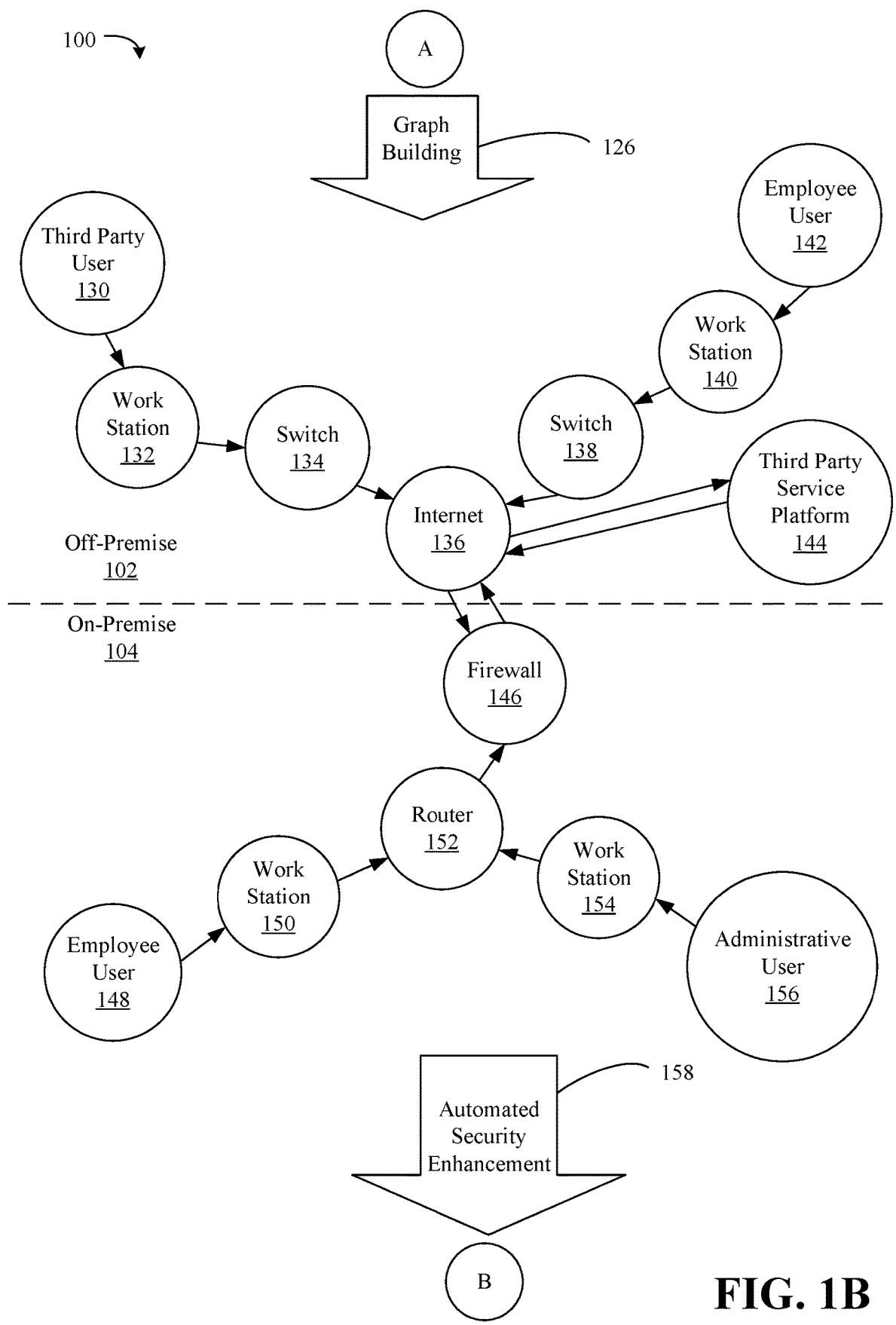
Figure 1C:
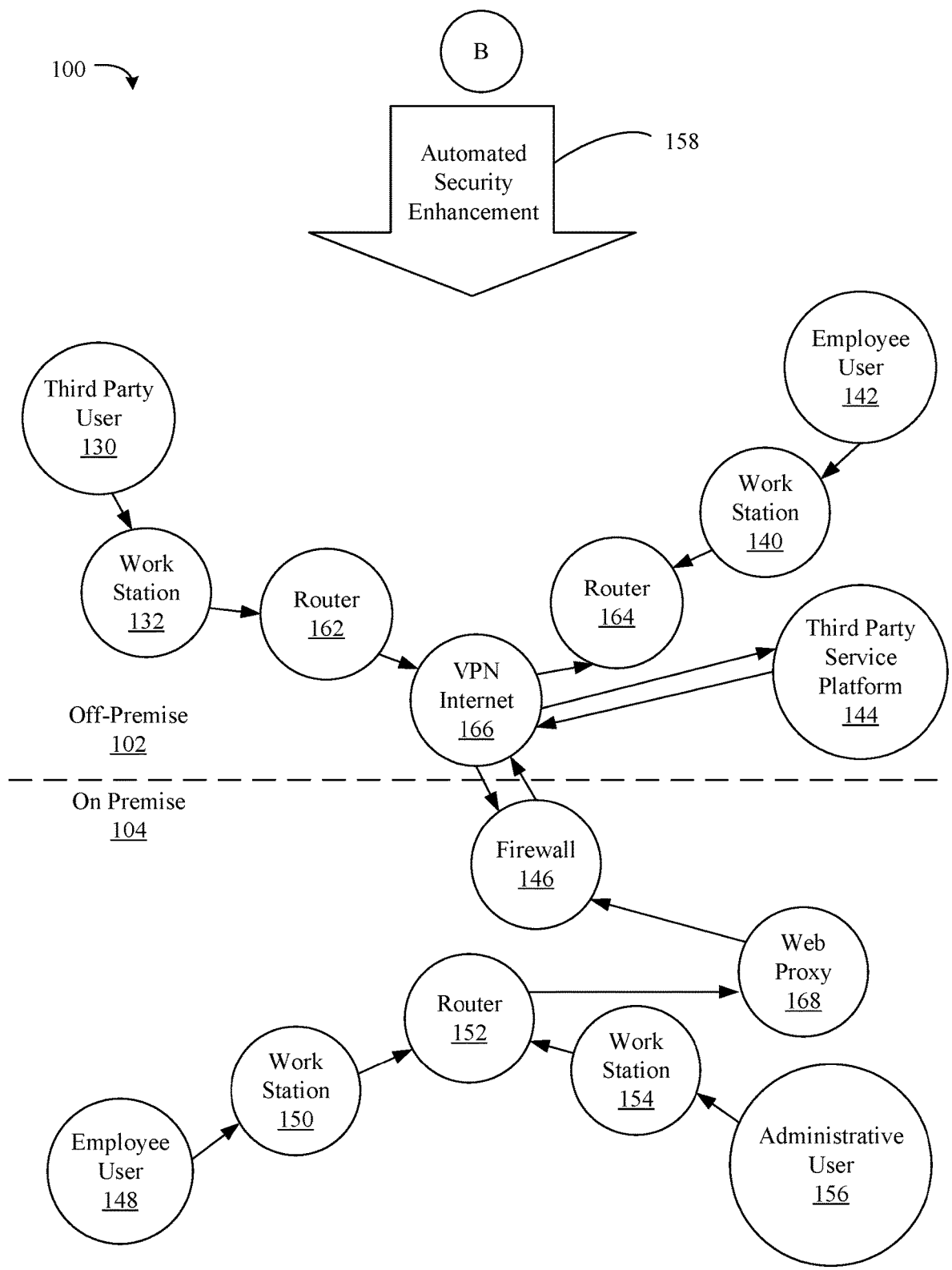

FIGS. 1A-1C show a process 100 to generate a security enhanced computing architecture. Process 100 may be implemented by a computing device. FIG. 1A illustrates an incomplete schematic (directed graph) of a current computing architecture. The incomplete schematic may represent a general overview of the current computing architecture, but may lack some actual implementation details (e.g., components, connections, etc.) of the current computing architecture. The incomplete schematic is an input data structure that includes nodes 106, 108, 110, 112, 114, 116, 118, 120, 122, 124 that are interconnected with links. The process 100 may include building a graph 126 from the incomplete schematic to generate a computed directed graph of the current computing architecture.

Building the graph 126 may include an automated process or computational analysis to automatedly collect environmental data to generate the computed directed graph of the current architecture by identifying one or more missing elements from the incomplete schematic. For example, the automated process may include collection and analysis of Dynamic Host Configuration Protocol (DHCP) or Domain Name System (DNS) servers to ascertain how many devices are on a network, tracking internet traffic to determine sending and destination computing nodes of internet traffic, analyzing firewall data to identify hosts (e.g., devices that generate or receive network traffic), analyzing data from asset inventory solutions (e.g., specific devices), to determine every device in the organization's network (e.g., computing and/or networking devices) and software applications, packages, firmware, etc., they are using. Such an automated process may be difficult to implement by a human observer given the level of detail (granular analysis prone to error) and magnitude (thousands of nodes) of enterprises. Thus, the automated process described above is far more accurate than any human generated observations. Thus, as shown in FIG. 1B, a computed directed graph may be generated by using the incomplete schematic as a guide, and then augmenting the incomplete schematic with collected data. In some embodiments, a data collection of data structures and analysis process of the data structures may be executed as follows to generate the computed directed graph of FIG. 1B.

Asset inventory may be considered a high priority data set. That is, an accurate asset inventory may lead to higher quality security infrastructure analysis and hence lead to a higher quality computed directed graph. Some examples of asset inventory may include work stations, networking devices, servers, and any other authorized and unauthorized devices (e.g., mobile devices) that are usually connected to a client/organization's network. Several sources that have various data structures may be utilized to identify an asset inventory list. The sources may include the following:

1. Asset discovery tools (e.g., passive and active device scanning tools).
2. DHCP servers. In particular, most of the aforementioned devices eventually connect to the internet through the network, and DHCP servers is where the devices may obtain an IP address to access the internet. Thus, the assets are registered at the DHCP servers, and therefore the assets may be identified from the DHCP servers.
3. DNS servers. In particular, DNS servers may log all address translations from internal devices. The address translations may be used for asset discovery as well.
4. Firewall/proxy logs and rules as they check all incoming and outgoing traffic in case an unauthorized device is connected to the organization network.
5. Miscellaneous other sources may be used for asset discovery.

Once the assets are discovered, some embodiments provide for identifying services and applications running on the devices. Some embodiments may focus on the services, applications or devices generating network traffic while ignoring services, applications and devices that do not generate network traffic since the network traffic is usually important for network security design. That is, network traffic may, in some contexts, be considered a precursor to security weaknesses. Some organizations may use agent-based monitoring systems to constantly check every single host (e.g., workstations and servers) and their OS and/or applications for security update and compliance. The agent-based monitoring system may contain another data structure that is another source for service and/or application inventory in such organizations. In particular, the agent-based monitoring system may include a data structure that maps each service to asset(s) running or using (remotely or locally) the service. As described above, the data structures may be very complex and unorganized. Capturing such data structures manually may be nearly impossible to do correctly, and may result in a failure to capture all details of that which is being used by all users and that which has to be monitored and secured. The technical solutions described below address the above-noted deficiencies. As already noted, there may be multiple sources for data collection and an efficient solution for data collection may utilize API interaction and/or integrate with current solutions (e.g., asset discovery solutions) and databases (i.e., any repository already used in client's environment to keep asset and application/service data), and build a knowledge base to be used in the graph building process 126.

As illustrated in FIG. 1B, the current architecture may be mathematically modeled via a computer-implemented, computational intensive process as the computed directed graph with a set of nodes 130, 132, 134, 136, 138, 140, 142, 144, 146, 148, 150, 152, 154, 156 that may each represent a network device, a security device, a workstation, an application, an operating system (OS), a user or a customized element. A customized element may include a name that is defined by a user (e.g., an expert in the security field) and may be stored as a new type of node in the system. The computed directed graph may further include directed edges (e.g., links) between the nodes 130, 132, 134, 136, 138, 140, 142, 144, 146, 148, 150, 152, 154, 156. Each particular node of the nodes 130, 132, 134, 136, 138, 140, 142, 144, 146, 148, 150, 152, 154, 156 may include properties such as an identification (ID) that is a unique identifier for the node, a node type (e.g., network device, security device, application, OS, user, custom, etc.), location, and/or extended properties associated with the particular node. For example, the particular node may have extended properties that are based on a type of the particular node, and may have extended properties that are applicable to the node type. Some examples of extended properties for node of type "User" are as follows:

1. "User type" property may be any of employee, 3$^{rd}$ parry, contractor, guest, malicious actor;
2. "Role property" may be any role(s) of the user in the organization;
3. "Department property" that describes a department of the user;
4. "Group property" that describes the particular working group of the user; and
5. "Permissions property" that may be explicit/implicit. "Implicit permissions" may be derived based on user role, location, group, and department.

Some examples of work station extended properties are as follows:

1. "Operating System Property" that describes the work station operating system;
2. "Type Property" that describes a physical, persistent virtual machine (VM), non-persistent VM of the workstation; and
3. "Allowed IDs Property" that describes a list of IDs that may access the work station.

The nodes 130, 132, 134, 136, 138, 140, 142, 144, 146, 150, 152, 154, 156 may have properties as follows:

TABLE I

| Node | Properties |
| --- | --- |
| Third Party User 130 | ID = 5; Type = Third Party |
| Work Station 132 | ID = 5; Application = Synchronization for Third Party Service Platform 144 |
| Switch 134 | Type = Network Device |
| Internet 136 | Type = Network Provider |
| Switch 138 | ID = 1; Type = Network Device; Location = Home and Off-Premise 102 |
| Work Station 140 | ID = 4; Application = Chrome; Location = Home and Off-Premise 102 |
| Employee User 142 | ID = 3; Location = Home and Off-Premise 102; Type = Employee; State = California |
| Third Party Service Platform 144 | Type = System-as-a-Service Provider |
| Firewall 146 | Location = On-Premise 104 |
| Router 152 | Location = On-Premise 104; Type = Network Device and Security Device; Vendor = Cisco; Model= 500X |
| Work Station 150 | ID = 1; Location = On-Premise 104; Type = Physical; OS = Windows; Application = Chrome |
| Employee User 148 | ID = 1; Type = Employee; Location = On-Premise 104 |
| Work Station 154 | ID = 2; Type = Physical |
| Administrative User 156 | ID = 2; Type = Administrative; Application = Synchronization for Third Party Service Platform 144 |

Each directed edge (e.g., link) may connect two nodes from the nodes 130, 132, 134, 136, 138, 140, 142, 144, 146, 148, 150, 152, 154, 156 in the computed directed graph to model a relationship between the two nodes. The directed edges may represent physical and/or logical relations between the nodes 130, 132, 134, 136, 138, 140, 142, 144, 146, 148, 150, 152, 154, 156. In some embodiments, the directed edges include a direction identifier (e.g., the arrow head) to indicate a direction of communication. In some embodiments, a direction between nodes may be represented by a tuple, such as tuple (A, B) that is stored in a database. A tuple may be an ordered list of 2 elements, so in the above example the tuple (A, B) means the direction is from node A to node B.

Each link may have ID, Type and Supports properties. The ID property is a unique identification to identify the link in the computed directed graph. The type property includes a network and a logical component. The network component describes the type of connection (e.g. wired, Wi-Fi, fiber, satellite, etc.) between two nodes. The logical component describes how two nodes are related (e.g., "runs on," "has access to," "connects to," etc.). For example, a user of type 3 rd party "has access to" another node (e.g. a web application) for maintenance and/or troubleshooting purposes. The supports property outlines the protocols that the link may support (e.g., FTP, HTTPS, TLS, ICMP, etc.). Table II below provides example link properties:

TABLE II

| Link | Properties of Link that Originates from Node |
| --- | --- |
| Third Party User 130 to Work station 132 | "Runs on" |
| Work Station 132 to Switch 134 | "Connects to," "WiFi" and "HTTPS" |
| Switch 134 to Internet 136 | "Connects to" |
| Internet 136 to Third Party Service Platform 144 | "Connects to" |
| Internet 136 to Firewall 146 | "allows HTTPS" |
| Switch 138 to Internet 136 | "Connects to" and "HTTPS" |
| Work Station 140 to Switch 138 | "Connects to," "Wi-Fi" and "HTTPS" |
| Employee User 142 to Work Station 140 | "Runs on" |
| Third Party Service Platform 144 to Internet 136 | "Connects to" |
| Firewall 146 to Internet 136 | "HTTPS" |
| Router 152 to Firewall 146 | "Connects to" and "HTTPS" |
| Work Station 150 to Router 152 | "Connects to," "HTTPS," and "Wired" |
| Employee User 148 to Work Station 150 | "Runs on" |
| Work Station 154 to Router 152 | "Connects to" and "HTTPS" |
| Administrative User 156 to Work Station 154 | "Runs on" |

For example and as noted above, the link between the employee user 142 and the work station 140 may include a logical component that is "runs on." The link between the switch 138 and the work station 140 may include a logical property that includes "connects to," and supports property that includes WiFi and HTTPS. Thus, a recordation of each node 130, 132, 134, 136, 138, 140, 142, 144, 146, 148, 150, 152, 154, 156 and the directed edges is generated.

A user may be able to modify the computed directed graph through a user interface. The computed directed graph may further be stored in a database.

The process 100 may include applying automated security enhancements 158 based on constraints to the computed directed graph to generate a security enhanced directed graph. The constraints may include a cost constraint. The cost constraint may be a requirement to maintain a cost for security enhancements under a certain monetary value. Thus, the cost constraint may include a maximum allowable cost. The maximum allowable cost may be compared, via a computing device, to an estimated amount of funds that is required to build an output architecture based on the security enhanced directed graph produced by the process 100. If the maximum allowable cost is more than or equal to the estimated cost, the cost constraint may be considered to be met. If however the maximum allowable cost is less than the estimated cost, the cost constraint may not be met.

The constraints may further include a time constraint. The time constraint may be considered as two components. As discussed above, a computed directed graph may be generated from the incomplete schematic. The process 100 may modify the computed directed graph to generate the security enhanced directed graph. The security enhanced directed graph may reflect a desired implementation in the real-word.

A first component to the time constraint may be satisfied when a graph generation time meets an objective time. The graph generation time may be an estimated fastest time needed for the automated process 100 to generate, from the incomplete schematic, a solution (e.g., security enhanced directed graph) that meets all, or as many as possible, of the requirements and objectives (e.g., constraints) for a particular scenario and/or client. Thus, some embodiments identify the fastest time in which a computing device may be able to generate the final graph (e.g., security enhanced directed graph) and calculate all costs so that it may be presented to a user and/or client. That is, the fastest time may be a time between an initial generation of the incomplete schematic as well as the time needed to collect data and objectives for the process 100, and the time at which a final solution (e.g., security enhanced directed graph) is presented. The fastest time may be referred to as the graph generation time. The graph generation time may be compared to the objective time.

For example, the objective time may be user defined and set to one day. In such a case, if the graph generation time is projected to take at least a week, the objective time would not be met by the graph generation time. That is, the graph generation time is longer than the objective time, and therefore the graph generation time does not meet the objective time. In such a case, an alternative means of identifying a solution may be executed. In contrast, if the graph generation time is equal to or less than the objective time, than the graph generation time will be deemed to have met the objective time.

In some embodiments, the process 100 may be able to predict several different types of solutions (e.g., security enhanced directed graphs). In such embodiments, only those solutions that have graph generation times that meet (are equal to or less than) the objective time will be pursued by the process 100, thereby reducing resource wastage and enhancing efficiency.

For example, solutions which have predicted graph generation times greater than the objective times may not be investigated or executed. For example, it may be predicted that a short period of time (e.g., one day) will be needed to generate a first solution that includes state-of-the art hardware and software. The first solution may be expensive due to its state-of-the art nature. It may be predicted that a long period of time (e.g., one month) will be needed to generate a second solution that utilizes less expensive second-hand hardware and/or software. If the objective time is set to one week, the first solution may meet the objective time, but the second solution does not meet the objective time. Thus, the first solution may be pursued and fully developed, and the second solution may be abandoned so as to not be pursued and/or developed.

In some embodiments, the graph generation time may be generated based on previously generated models or previous solution evolutions (e.g., evolutions that were applied on different input architectures). For example, data associated with the previous solution evolutions may be stored. Previous input graphs (that were used during the previous solution evolutions) that are similar to a current input graph (e.g., incomplete schematic and/or computed directed graph) may be identified by the process 100. The previous input graphs may correspond to other network architectures that are different than the current network architecture. The actual timings needed to generate security enhanced directed graphs from the previous input graphs may have been recorded during the previous solution evolutions. Thus, an average of the actual timings of the previous solution evolutions may be calculated and utilized as an estimate of the current graph generation time.

A second component to the time constraint may be satisfied when a deployment time meets an implementation time. For example, some enterprises may prefer some solutions that may be expensive, but are able to be implemented/deployed with great speed to meet the implementation time. The time between generation of the final solution (e.g., security enhanced directed graph) and a complete deployment of the final solution in the network may be referred to as deployment time. The implementation time may be a user set time limit.

The deployment time may be the time needed to deploy a solution (e.g., final graph) generated by a machine. For example, the deployment time may be a time estimate that is generated based on the complexity or changes required in a current organization's network (e.g., the computed directed graph) to implement modifications presented in the final graph. In some embodiments, an average of previous solution evolutions may be utilized similar to as above. If the implementation time is less than the deployment time, then the deployment time does not meet the implementation time. In contrast, if the implementation time is equal to or greater than the deployment time, then the deployment time does meet the implementation time, and the second component may be deemed satisfied.

As such, there may be two components to the time constraint. Both the first and second components may need to be satisfied in order for the time constraint to be met. In some embodiments, if the first component is not met by any possible solution, the process may be aborted rather than determining whether the second component is satisfied. Doing so may be more efficient and reduce power usage.

The deployment time and the objective time may be a user defined, and/or may include an amount that is calculated based on security enhancements and identified weaknesses. For example, a maximum allowable time period may be automatically calculated as follows. Each of the identified weaknesses may be a security threat in the computed directed graph, and is associated with a security threat level. The maximum allowable time period may be automatically adjusted to implement the security enhancements more quickly if one or more of the security threat levels are determined to meet a predetermined threat level that is deemed unsafe.

For example, if private data is identified as being susceptible to a malicious attack and potentially stolen, the process 100 may identify that the security threat level is high and meets a predetermined threat level. In response to the identification, the maximum allowable time period may be automatically adjusted and shortened. If the user defined amount is greater than the maximum allowable time period, the maximum allowable time period may be utilized rather than the user defined amount. One or more of the deployment time or the objective time may be adjusted and/or set so that the maximum allowable time period is greater than a total sum of the deployment time and the objective time.

So for example, if the security threat level is high, the maximum allowable time period may be short. Further, in response to the identification of the high security threat level, the objective time may be set to a lowest possible time amount that may generate a solution, and the deployment time may be set to a value that is the maximum allowable time period minus the lowest possible time amount. In contrast, if the security threat level is low, the user defined amount may be used rather than the maximum allowable time period and/or the maximum allowable time period may be set to a high value.

The constraints may further include a security constraint. The security constraint may include a security parameter that is to be met. For example, the security parameter may include protecting a certain segment of the network, protecting a certain type of data (e.g., private data) and so forth. In some embodiments, the security parameter may be automatically identified based on user inputs. For example, the user may identify an abstract security constraint, such as private data must be protected from malicious attacks, and the process 100 may generate a hardware and/or software based security constraint (e.g., protecting segments of the network that store the private data) based on the abstract security constraint. Thus, a user may identify an abstract security constraint that is divorced from underlying hardware and/or software considerations, and the process 100 may identify hardware and/or software based security constraint from the abstract goal.

The constraints may further include a goal constraint. For example, the goal constraint may be an objective, such as to support remote telework, to produce sufficiently high internet speeds and so forth. The goal constraint may not necessarily be a security enhancement, but may be usage modalities that may be affected by the security enhancement. For example, some expected usage modalities of a network may be to support remote telework, teleconferencing, sufficient internet speeds to conduct business, and so forth. Thus, goal constraints may be identified to ensure that the security enhanced network supports the actual usage modalities for the network.

As described above, it is possible to mathematically prove that the security enhanced directed graph meets the constraints. For example, the cost of upgrading the current architecture to a security enhanced architecture may be mathematically calculated and compared against the cost constraint. Some embodiments may include mathematically verifying that there are hardware and/or software to protect sensitive data (e.g., Social Security Numbers, future plans, etc.) at any repository that sensitive data is present. Another example may include mathematically proving that there is no (network) path between data users and data sources in which a data security control does not exist.

As illustrated in FIG. 1C, several adjustments may be made to the computed directed graph to automatically generate the security enhanced directed graph. For example, in the computed directed graph of FIG. 1B, the switches 134, 138 may lack firewalls, and therefore be deemed to be security risks. Thus, in the security enhanced directed graph of FIG. 1C, the switches 134, 138 may be replaced with higher security routers 162, 164 that include built in firewalls to enhance security. Further, the internet 136 may be unsecured for at least the reason that data may be intercepted. As such, the internet 136 may be deemed a security risk, and replaced by Virtual Private Network (VPN) Internet 166 to establish a virtual encrypted tunnel between work stations 132, 140, 150, 154 to third party service platform 144. Further the connection between the firewall 146 and router 152 may be security enhanced by a web proxy 168 to filter and/or block suspicious internet traffic.

Each of the process 100 and/or methods described herein may be implemented in hardware, in software, or in some combination thereof. For example, each of the method blocks described herein may be implemented in configurable logic such as, for example, programmable logic arrays (PLAs), field programmable gate arrays (FPGAs), complex programmable logic devices (CPLDs), or in fixed-functionality logic hardware using circuit technology such as, for example, application specific integrated circuit (ASIC), complementary metal oxide semiconductor (CMOS) or transistor-transistor logic (TTL) technology, or any combination thereof. Alternatively or additionally, these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the modules may be written in any combination of one or more operating system applicable/appropriate programming languages, including an object oriented programming language such as JAVA, SMALLTALK, C++ or the like and conventional procedural programming languages, such as the "C" programming language or similar programming languages.

Figure 2:
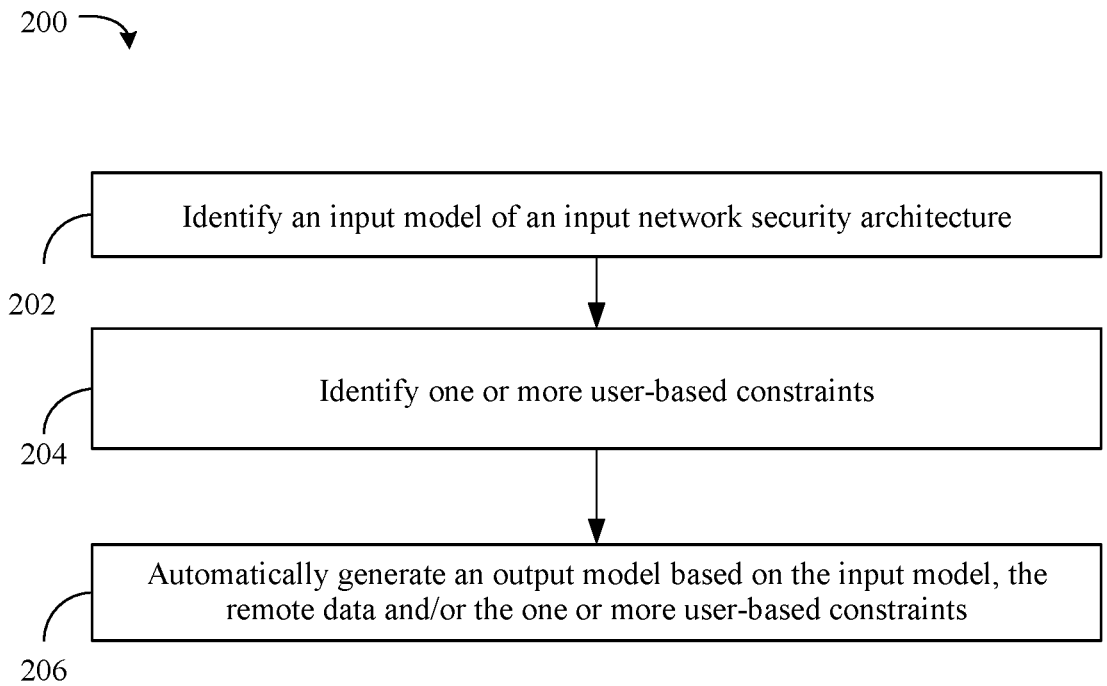
FIG. 2 illustrates a method to generate a security enhanced output model according to an exemplary embodiment.

FIG. 2 illustrates a method 200 of generating an output model. Processing block 202 identifies an input model of an input network security architecture. Processing block 202 may include accessing one or more remote data sources to automatically retrieve, via computing device, remote data associated with security for a computing architecture. Processing block 204 identifies one or more user-based constraints. Processing block 206 automatically generates, via computing device, an output model based on the input model, the remote data and/or the one or more user-based constraints. The output model represents an output network security architecture that complies with at least one of the one or more user-based constraints. Processing block 206 may include generating a plurality of different output models based on the input model, the remote data and/or the one or more user-based constraints. Each of the plurality of different output models represents an output network security architecture that complies with at least one of the one or more user-based constraints. The method 200 may enhance security by generating more secure output models with lower latency and power consumption.

Figure 3:
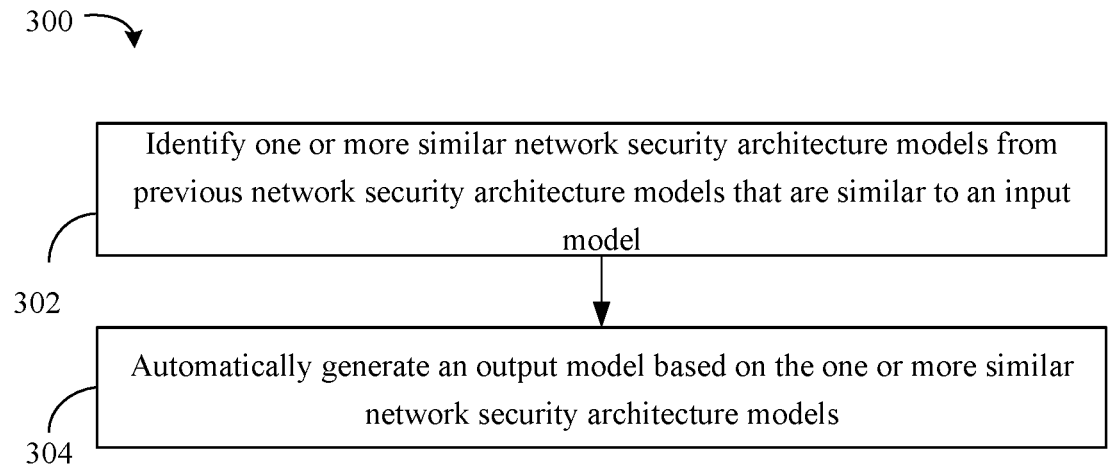
FIG. 3 illustrates a method to generate a security enhanced output model from a similar network security architecture model according to an exemplary embodiment.

FIG. 3 is a method 300 of automatically generating, via a computing device, an output model based on previously generated models. Processing block 302 includes identifying one or more similar network security architecture models from previous network security architecture models that are similar to an input model. For example, the input model and/or one or more user-based constraints associated with the input model may be compared to the previous network security architecture models and/or previous user-based constraints associated with the previous network security architecture models. Based on the comparing, block 302 automatically identifies, via computing device, the one or more similar network security architecture models from the previous network security architecture models that are similar to the input model. Processing block 304 includes automatically generating the output model based on the one or more similar network security architecture models.

Figure 4A:
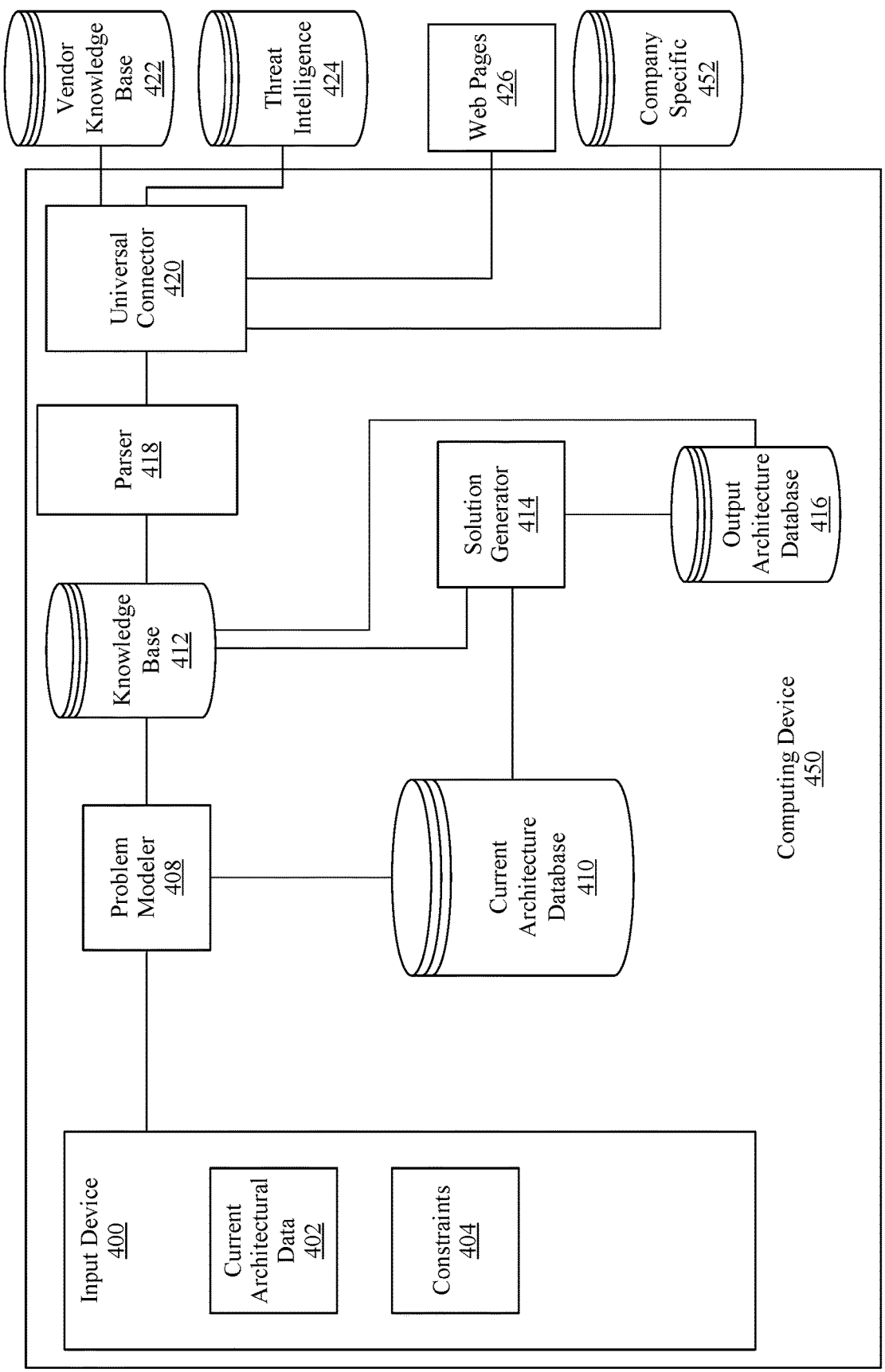
FIGS. 4A and 4B illustrate aspects of an overall system architecture to generate a security enhanced network architecture model according to an exemplary embodiment.

FIG. 4A illustrates a computing device 450 that includes a processor. The computing device 450 may implement a security enhanced process as described above with the processor in an efficient, accurate and low latency manner. The input device 400 may receive user inputs, such as current architectural data 402 and/or constraints 404. The input device 400 may be a keyboard, mouse, voice recognition device, image recognition device and so forth that are capable of receiving user input. The processor of the computing device 450 may implement any of the features and functions discussed below.

The current architectural data 402 may be a model that reflects a real-world organization information technology infrastructure. The model may be a graph (e.g., directed graph as described above). For example, the current architectural data 402 may represent a current architecture of the information technology infrastructure, and may illustrate components of the network and how the components are interconnected. For example, the current architectural data 402 may include schematics, identifying information (e.g., number of workstations, computers, routers, firewalls, etc.) and/or various files types that are associated with the current architecture.

As illustrated in FIG. 4A, the current architectural data 402 and/or constraints 404 may be provided to a problem modeler 408. The constraints 404 may include a cost constraint, a goal constraint, a security constraint and/or a time constraint as discussed above. In some embodiments, the constraints 404 and/or the current architectural data 402 may be provided in a natural language format, and the problem modeler 408 may employ natural language processing (NLP) to recognize the current architectural data 402 and/or the constraints 404. In some embodiments, the constraints 404 may be provided as an abstract concept (e.g., protect social security numbers), and the problem modeler 408 may modify the abstract concept into a hardware and/or software format (e.g., protect specified servers, where the specified servers include social security numbers) that is compatible with the solution generator 414.

In some embodiments, the current architectural data 402 may be incomplete, and so a computed current directed graph of the current architecture may not be generated on the current architectural data 402 alone. As such, the problem modeler 408 may initiate an automated process to verify that the current architectural data 402 is accurate. For example, the problem modeler 408 may access the knowledge base 412 to identify company specific data related to the current architecture of the information technology infrastructure, and determine whether the company specific data matches the current architectural data 402.

If the problem modeler 408 determines that the current architectural data 402 is inaccurate, the problem modeler 408 may collect data (e.g., network data) to generate the computed current directed graph of the current architecture. For example, the problem modeler 408 may identify details of the current architecture by collection and analysis of Dynamic Host Configuration Protocol (DHCP) or DNS servers to ascertain how many devices are on a network, track internet traffic to determine sending and destination computing nodes of internet traffic, analyze firewall data and/or data from asset inventory devices and lists. In some embodiments, the problem modeler 408 may access the knowledge base 412 (discussed in further detail below) to retrieve data (e.g., the network data and/or the company specific data). The problem modeler 408 may generate the computed current directed graph based on the retrieved data and/or collected data. The problem modeler 408 may store the constraints 404 and the computed current directed graph in a current architecture database 410.

In some embodiments, the current architectural data 402 may identify the elements of the current architecture of the network. To facilitate a security analysis, the problem modeler 408 may access the knowledge base 412 to further augment the elements with security data. For example, the current architectural data 402 may identify an element (e.g., router), but may not include the firmware type of the element. The problem modeler 408 may access the knowledge base 412 to identify the firmware type, and may further include the firmware type in the computed current directed graph. Thus, attributes of identified elements may be retrieved from the knowledge base 412 and included in the computed current directed graph.

The universal connector 420 may access different remote data sources to retrieve remote data associated with security. The knowledge base 412 may store available information from a vendor knowledge base 422, a threat intelligence database 424, public web pages 426, and/or other knowledge base systems that are associated with network and/or device security. The universal connector 420 may provide a mechanism that may connect, communicate, and fetch the information from vendor knowledge base 422, threat intelligence database 424 and/or web pages 426. The vendor knowledge base 422, threat intelligence database 424 and web pages 426 may be referred to as "remote sources." Additionally, the universal connector 420 may communicate with local sources, such as an internal (non-public) company specific database 452.

The vendor knowledge base 422 may include data relating to different security solutions (routers, anti-virus protection, hardware devices, etc.) provided by various sources and/or companies. The threat intelligence database 424 may include information relating to viruses, identified security vulnerabilities, zero-day attacks, etc. The universal connector 420 may include a web crawler to search web pages 426 for cyber security information. The web crawler may be programmed to utilize various search queries to collect data related to cyber security from the web pages 426. The universal connector 420 may collect any of the data described above.

In some embodiments, the knowledge base 412 may be a repository of all the detailed information for nodes and links of an incomplete current directed graph associated with the current architectural data 402. For example, if a node is a "Network Device" then the knowledge base 412 may have details of vendor, supported functionalities, estimated price, time to deploy, etc. for that "Network Device" to generate the computed current directed graph. Further, the solutions generator 414 may use such details to determine output directed graphs.

The knowledge base 412 may be categorized into the following types: 1) device information, 2) application information, 3) user information, 4) link information (various fabrics and internet protocols), and/or 5) custom objects information. Further, a data structure in the knowledge base 412 may be structured (e.g. database tables), unstructured (e.g. texts, web pages, emails, etc.), semi-structured (e.g. NoSQL DB, XML, CSV, etc.). The knowledge base 412 may be a big data (e.g. Hadoop) platform. The data of the knowledge base 412 may be modified by a user.

The universal connector 420 may function as an interpreter between the computing device 450 and the various remote data sources as well as the company specific database 452 to translate data from various formats into a universal format. For example, the universal connector 420 may support standard protocols (e.g. Open Database Connectivity, Java Database Connectivity, Object Linking and Embedding Database, web Hadoop Distributed File System, etc.) and/or custom protocols to connect to one or more of a vendor databases, knowledge bases, file repositories, API calls, web pages, and other data sources. In the present example, the universal connector 420 connects to the vendor knowledge database 422, the threat intelligence database 424 and the web pages 426 to retrieve remote data and format the remote data accordingly.

Further, the universal connector 420 may access the company specific database 452 to identify the customized data and/or the network data discussed above. For example, the customized data may not be publicly available, but may only be accessed after authentications of the computing device 450. For example, the customized data may be associated with and/or generated by the real-world organization. The customized data may include aspects of the current architecture. For example, if the organization develops a security product (e.g., hardware and/or software) in-house, the details of the security product may not be publicly available. The security product may be used in the organization and as such, the universal connector 420 may access the company specific database 452 to determine the parameters, configurations and/or specifications of the security product, as well as to identify the network data. The problem modeler 408 may access the details of the security product from the knowledge base 412 to populate security product nodes of the incomplete current directed graph.

The universal connector 420 may provide the universally formatted remote data to parser 418. The universal connector 420 and the parser 418 may correspond to an "interface." The parser 418 may parse the universally formatted remote data to identify relevant data points. For example, one of the web pages 426 may include information (e.g., order products forms, copyright data, etc.) that is irrelevant from a security perspective. The parser 418 may filter the irrelevant data and store the relevant data (e.g., available devices in the market, specifications of hardware, how many users in the network, etc.) in the knowledge base 412. Thus, parser 418 may analyze input data received by the universal connector 420. The input data may be compiled to a standard format for the knowledge base 412. The parser 418 may normalize different information formats to a unique and standard format for the knowledge base 412.

The solution generator 414 may access the current architecture database 410 and knowledge base 412 to generate one or more output architectures. The solution generator 414 may further estimate a cost and/or time to build (e.g., graph generation time and/or deployment time) each of the output architectures. The solution generator 414 may store the one or more output architectures, cost and/or time in the output architecture database 416. In some embodiments, the output architecture database 416 may be connected to the knowledge base 412 to read the security knowledge from the knowledge base 412. In some embodiments, the output architecture database 416 may write back to the knowledge base 412 to update information inside the knowledge base 412. In some embodiments, the output architecture is only stored in the output architecture database 416. Further yet, in some embodiments the knowledge base 412 may only store information about security devices, software, users, etc. and the knowledge base 412 is designed to only provide knowledge (context) to the incomplete input directed graph, computed directed graphs and output directed graphs.

Figure 4B:
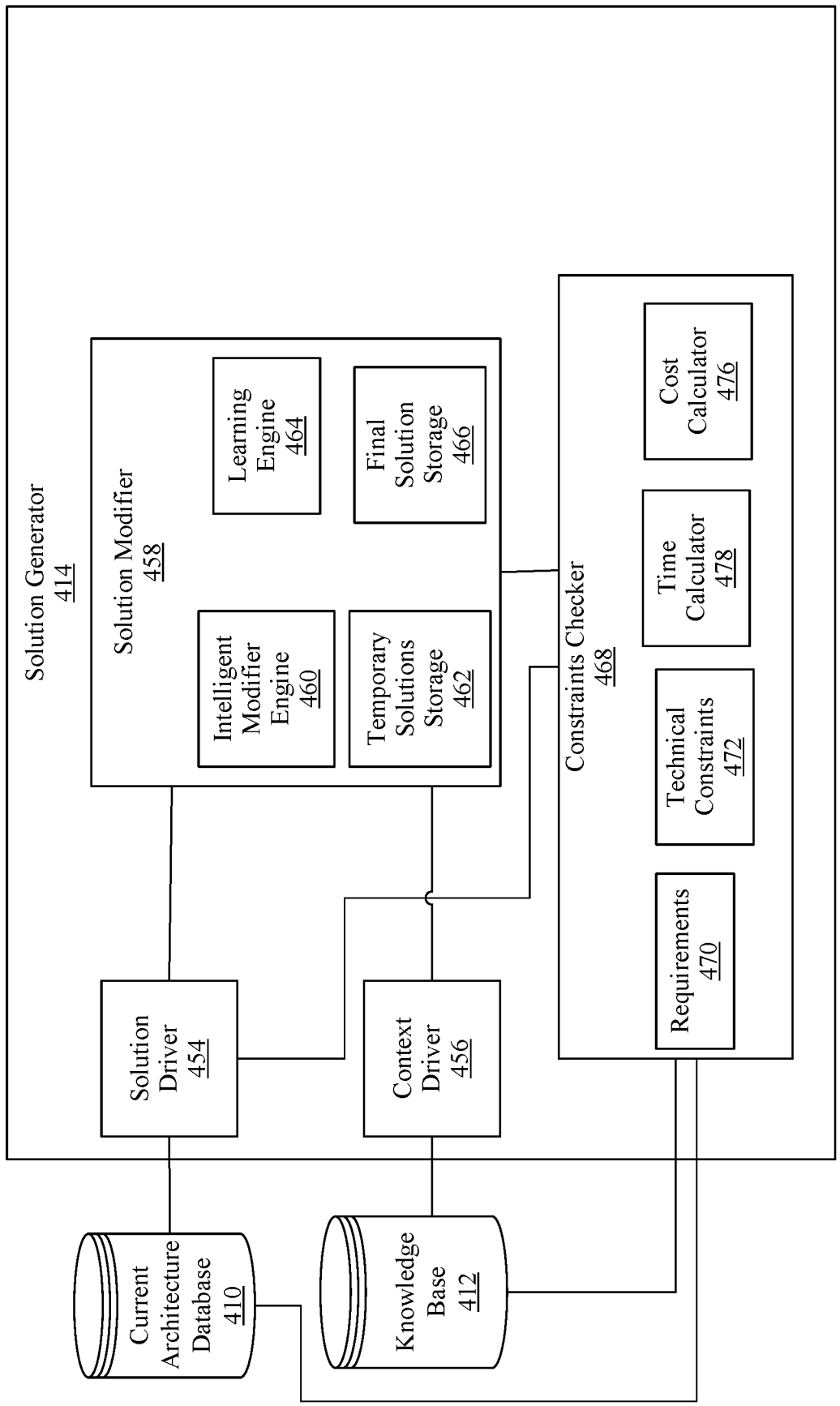

FIG. 4B illustrates the solution generator 414 in more detail. The solution generator 414 may include a context driver 456 that communicates with the knowledge base 412. The context driver 456 may retrieve relevant security upgrade data from the knowledge base 412. For example, the context driver 456 may reference the knowledge base 412 to identify state-of-the art security devices, modifications and/or techniques. The solution driver 454 may identify the constraints 404, the computed current directed graph of the current architecture and/or any other data stored in the current architecture database 410.

The solution modifier 458 may receive data from the solution driver 454 and the context driver 456 to generate an output directed graph from the computed current directed graph. For example, the solution modifier 458 may receive the computed current directed graph, the constraints 404 and/or the security upgrade data to generate the output directed graph. The solution modifier 458 may be connected to the output architecture database 416 to write and store the output directed graph in the output architecture database 416.

The solution modifier 458 may include the intelligent modifier engine 460. The intelligent modifier engine 460 may modify the computed current directed graph based on the constraints 404 and/or any other available data (e.g., knowledge of state-of-the art security devices) from the knowledge base 412 and/or the current architecture database 410 to generate a modified directed graph that enhances security. For example, the solution modifier 458 may add and/or remove directed edges and/or nodes from the computed current directed graph to enhance security and comport with the constraints 404.

The solution modifier 458 may communicate with the constraints checker 468 to identify whether the modified directed graph comports with the constraints 404. For example, the constraints checker 468 may include requirements 470 and the technical constraints 472. The requirements 470 may correspond to a goal, time, cost and/or security constraint of the constraints 404. The technical constraints 472 may correspond to properties (e.g., cost, firmware types, security threats, as discussed above etc.) of available security objects (e.g., security devices and/or software) that may be implemented in the network. The constraints checker 468 may access the current architecture database 410 to generate the requirements 470, and access the knowledge base 412 to generate the technical constraints 472.

The modified directed graph may be tested with references to the technical constraints 472 to determine whether the security and/or goal requirements are met. For example, constraints checker 468 may determine that a node of the modified directed graph corresponds to a software upgrade. The constraints checker 468 may then access the technical constraints 472 to identify technical properties of the software upgrade, and whether the security and/or goal constraints will be met by the software upgrade. For example, the constraints checker 468 may determine whether the software upgrade will support telework (i.e., a goal constraint) and protect private data (i.e., the security constraint). If so, the security and/or goal constraints will be deemed to be satisfied. Otherwise, the security and/or goals may not be deemed to be satisfied.

In some embodiments, the modified directed graph may be tested by a translation of each constraint, such as the requirements 470 and technical constraints 472, to a graph theory verifiable problem. For example, a test may include whether a data leak may occur between two systems (e.g., nodes of the modified directed graph). The constraints checker 468 may translate this test into a graph traversal problem. The constraints checker 468 may test whether a path exists between those two nodes leveraging a graph traversal algorithm.

In another example, to test whether cost constraints are met in the modified directed graph, the constraints checker 468 may traverse the modified directed graph to find all the newly added nodes and fetch the associated cost of each newly added node from knowledge base 412. A cost calculator 476 may then add all the associated costs to determine a final cost sum, and then compare the final cost sum to a monetary cap (i.e. cost constraint). If the final cost sum is less than a monetary cap, then the test may be deemed successful, otherwise the test may be deemed to be unsuccessful.

Further, the constraints checker 468 may calculate the cost and time to build the modified directed graph. For example, the constraints checker 468 may include the cost calculator 476 and a time calculator 478 to determine the cost, time needed to generate the modified directed graph (graph generation time) and time needed to modify network architecture (that is represented by the computed current directed graph) to an architecture represented by the modified directed graph (deployment time). For example, the technical constraints 472 may include pricing and time data relating to pricing and time implementations for the various nodes. With reference to the pricing and time data, the time and cost calculators 478, 476 may determine the total time and total cost needed to modify the network architecture. If the total time and/or total cost meets the time and/or cost constraints, the time and/or cost constraints may be deemed to have been met. Otherwise, the time and/or cost constraint may not be deemed to have been met. The constraints checker 468 may provide any of the calculations to the solutions modifier 458 so that the solutions modifier 458 may modify the modified directed graph further based on the calculations to converge towards a solution that does meet the constraints 404.

To modify the computed current directed graph, the intelligent modifier engine 460 may generate one or more temporary solutions (e.g., the modified directed graph) and store the one or more temporary solutions in the temporary solutions storage 462. For example, it may be more efficient to institute incremental security modifications to the computed current directed graph and converge towards best possible final directed graphs rather than incrementing wholesale and vast changes. The wholesale and vast changes may be technically infeasible as well as a high latency operation.

Thus, a first incrementally modified directed graph may be generated from the computed current directed graph. The constraints checker 468 may check the first incrementally modified directed graph against the constraints 404 to determine whether the first incrementally modified directed graph meets the constraints 404. If the first incrementally modified directed graph does not meet the constraints 404, the intelligent modifier engine 460 may receive notification of as much, and modify the first incrementally modified directed graph to generate a second incrementally modified directed graph that converges towards the constraints 404. The second incrementally modified directed graph may be tested as discussed above, and if the second incrementally modified directed graph meets the constraints 404, the second incrementally modified directed graph may be identified as being a final solution and stored in the final solution storage 466 as an output directed graph. Otherwise, the intelligent modifier engine 460 may generate a third incrementally modified directed graph from the second incrementally modified directed graph.

In some embodiments, the intelligent modifier engine 460 may generate several output directed graphs. For example, in the above, the second incrementally modified directed graph may be modified in several different ways to meet the constraints 404. Thus, the intelligent modifier engine 460 may generate several different final solutions from the second incrementally modified directed graph that are each stored as a final solution in the final solution storage 466.

In some embodiments, the intelligent modifier engine 460 may identify that it is impossible to simultaneously meet all the constraints 404 with one directed graph. In such a case, the intelligent modifier engine 460 may generate a different graph to meet each constraint 404. For example, if the time constraint cannot be met while also meeting the cost constraint, the intelligent modifier engine 460 may generate a first output directed graph that meets the time constraint, and a second output directed graph that meets the cost constraint.

In some embodiments, the intelligent modifier engine 460 may identify that a constraint (e.g., security constraint) may be difficult or impossible to meet. For example, the security constraint may be difficult to meet when viewed in conjunction with the cost constraint. Thus, the security constraint may be parsed into several distinct security constraints, and the intelligent modifier engine 460 may individually focus on meeting each of the distinct security constraints. For example, the security constraint may include a first constraint (e.g., third-party backups of data off-site) and a second constraint (e.g., protect personal and private data only on-site). The security constraint may be parsed into the first constraint and the second constraint. Thus, the intelligent modifier engine 460 may generate a first output directed graph that meets the first constraint and the cost constraint, and a second output directed graph that meets the second constraint and the cost constraint. Likewise, the other constraints 404 may be parsed into distinct constraints which may be individually met when the other constraints 404 are not met.

In some embodiments, the solution generator 414 may automatically implement modifications to a network security architecture. For example, in some embodiments, the solution generator 414 may determine several output directed graphs for a network architecture. Further, the solution generator 414 may gradually modify the input architecture until the output architecture satisfies all, or as many as possible, of the constraints that are modeled in constraints checker 468. As such, the solution generator 414 may modify (e.g., upgrade) the nodes and or links within the input graph. The modification may include adding new nodes or links.

The solution modifier 458 may include a learning engine 464. The learning engine 464 may be a cross-platform repository of previous solution evolutions (e.g., evolutions that were applied on different input architectures). In some embodiments, the learning engine 464 may track and record each time the solution generator 414 modifies a directed graph of a previous network architecture to enhance the security of the previous network architecture. The previous network architecture may be unrelated to the current network architecture in that the previous network architecture represents a different enterprise.

Further, the learning engine 464 may track and record the constraints associated with the previous network architecture, temporary solutions generated from the directed graph of the previous network architecture and the final output directed graphs associated with the previous network architecture. As an example, the solutions modifier 458 may have been previously employed to enhance a different network for a different enterprise. The learning engine 464 would then have been utilized to record an input directed graph that corresponds to the different network, the constraints for the different network (similar to as discussed above), temporary directed graphs (e.g., incrementally modified directed graphs) generated from the input directed graph, and an output directed graph generated from the temporary directed graphs and the input directed graph.

The intelligent modifier engine 460 may compare the computed current directed graph against previous directed graphs (temporary and input directed graphs) as stored by the learning engine 464. For example, the computed current directed graph and/or the constraints 404 may be compared to the input directed graphs and/or temporary directed graphs, as well as the constraints stored by the learning engine 464. The intelligent modifier engine 460 may compare the nodes, links, size and/or constraints of the computed current directed graph to the nodes, links, size and/or constraints of each of the input directed graphs and/or temporary directed graphs. A match may be detected when the nodes, links, size and/or constraints between the computed current directed graph are similar to the nodes, links, size and/or constraints of a similar input directed graph of the input directed graphs and/or temporary directed graphs.

If a match is detected between the computed current directed graph and the similar input directed graph, the intelligent modifier engine 460 may modify the computed current directed graph based on the evolution for the similar input directed graph. For example, the intelligent modifier engine 460 may adopt portions or all of the output graph generated from the similar input directed graph as a starting point for analysis to bypass several iterations of modifications and reduce computations and consequently associated costs and power. The process to enhance security may be similar to as described above, but may modify the output graph generated from the similar input directed graph to meet the constraints 404. In some embodiments, the computed current directed graph may be modified based on a temporary input graph.

Figure 5:
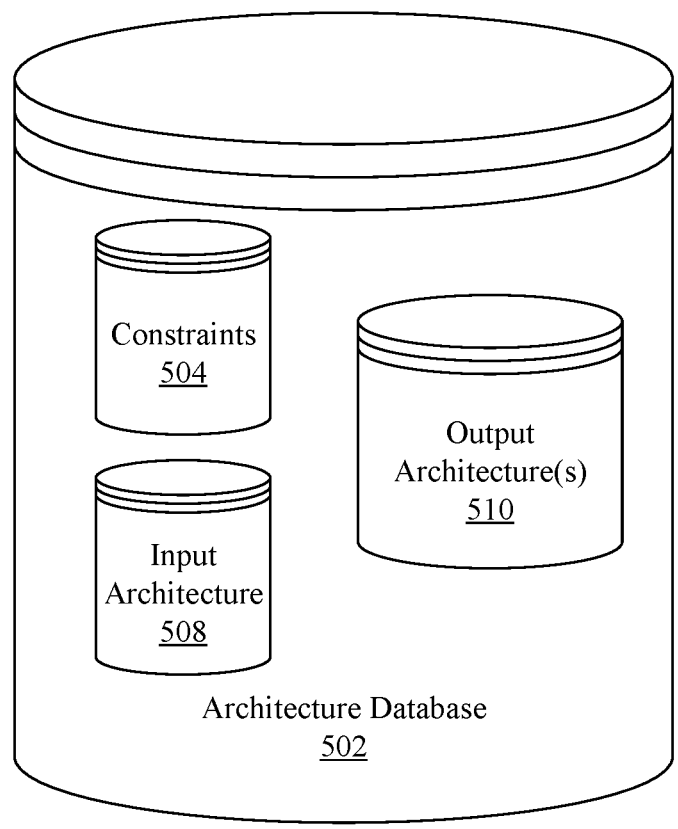
FIG. 5 illustrates an architecture database according to an exemplary embodiment.

FIG. 5 illustrates an architecture database 502. The architecture database 502 may correspond to an input and/or an output architecture database described herein. The current (input) and output architecture may be modeled with a graph (nodes, links and properties of the nodes and/or links) that is stored in the input architecture 508. The input architecture 508 may be a graph repository (e.g. a graph data base). After the automated intelligent analyst models an input architecture as a model (e.g., input graph), the automated intelligent architect may store the model into the architecture database 502 and manage (e.g., open, edit, delete) the model as needed (may be user accessible). A solution generator may also modify a copy of the input graph to generate the output architecture (e.g., output graph). The output architecture may be stored in the output architecture database 510. The constraints database 504 may store constraints.

The flowchart and block diagrams in the Figures illustrate the architecture, functionality, and operation of possible implementations of systems, methods and computer program products according to various exemplary embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block(s) may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The methods shown herein may generally be implemented in a computing device or system. The computing device or system may be a user level device or system or a server-level device or system. More particularly, the methods may be implemented in one or more modules as a set of logic instructions stored in a machine or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the methods and processes of FIGS. 1A, 1B, 1C, 2 and 3 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, and/or other structural components that are native to hardware (e.g., host processor, central processing unit/CPU, microcontroller, etc.).

Example sizes/models/values/ranges may have been given, although embodiments are not limited to the same. Where specific details are set forth in order to describe example embodiments, it should be apparent to one skilled in the art that embodiments can be practiced without, or with variation of, these specific details. The description is thus to be regarded as illustrative instead of limiting.

Those skilled in the art will appreciate from the foregoing description that the broad techniques of the one or more embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A security design system, comprising:
an interface to access one or more remote data sources to retrieve remote data associated with security for a computing architecture; and
a processor communicatively coupled to the interface, wherein the processor is configured to:
identify an input model of an input network security architecture;
identify one or more user-based constraints;

automatically generate an output model based on the input model, the remote data and the one or more user-based constraints, wherein the output model represents an output network security architecture that complies with at least one of the one or more user-based constraints;

compare the input model and the one or more user-based constraints to previous network security architecture models and previous user-based constraints associated with the previous network security architecture models to identify one or more similar network security architecture models from the previous network security architecture models that are similar to the input model; and automatically generate the output model based on the one or more similar network security architecture models.

2. The system of claim 1, wherein the processor is configured to generate a plurality of different output models based on the input model, the remote data and the one or more user-based constraints, wherein each of the plurality of different output models represents an output network security architecture that complies with at least one of the one or more user-based constraints.

3. The system of claim 1, wherein the one or more user-based constraints is to include one or more of a cost constraint, a time constraint, a security based constraint or a goal constraint.

4. The system of claim 1, wherein the remote data is to include one or more of hardware specifications, costs of security implementations, time for security implementations, network threat data or webpage data.

5. The system of claim 1, wherein the input model and the output model are each a directed graph.

6. The system of claim 1, wherein the processor is configured to:

receive an input data structure that corresponds to the input network security architecture;

conduct an automated analysis of the input network security architecture to identify one or more missing elements that are part of the input network security architecture and missing from the input data structure; and generate the input model from the input data structure and the automated analysis.

7. A method, comprising:

accessing one or more remote data sources to retrieve remote data associated with security for a computing architecture;

identifying an input model of an input network security architecture;

identifying one or more user-based constraints;

automatically generating an output model based on the input model, the remote data and the one or more user-based constraints, wherein the output model represents an output network security architecture that complies with at least one of the one or more user-based constraints;

comparing the input model and the one or more user-based constraints to previous network security architecture models and previous user-based constraints associated with the previous network security architecture models;

based on the comparing, identifying one or more similar network security architecture models from the previous network security architecture models that are similar to the input model; and automatically generating the output model based on the one or more similar network security architecture models.

8. The method of claim 7, further comprising generating a plurality of different output models based on the input model, the remote data and the one or more user-based constraints, wherein each of the plurality of different output models represents an output network security architecture that complies with at least one of the one or more user-based constraints.

9. The method of claim 7, wherein the one or more user-based constraints includes one or more of a cost constraint, a time constraint, a security based constraint or a goal constraint.

10. The method of claim 7, wherein the remote data includes one or more of hardware specifications, costs of security implementations, time for security implementations, network threat data or webpage data.

11. The method of claim 7, wherein the input model and the output model are each a directed graph.

12. A non-transitory computer readable medium comprising a set of instructions, which when executed by one or more processors of an authentication device, cause the one or more processors to:

retrieve remote data associated with security for a computing architecture;

identify an input model of an input network security architecture;

identify one or more user-based constraints;

automatically generate an output model based on the input model, the remote data and the one or more user-based constraints, wherein the output model represents an output network security architecture that complies with at least one of the one or more user-based constraints;

compare the input model and the one or more user-based constraints to previous network security architecture models and previous user-based constraints associated with the previous network security architecture models to identify one or more similar network security architecture models from the previous network security architecture models that are similar to the input model; and automatically generate the output model based on the one or more similar network security architecture models.

13. The non-transitory computer readable medium of claim 12, wherein the one or more processors are to generate a plurality of different output models based on the input model, the remote data and the one or more user-based constraints, wherein each of the plurality of different output models represents an output network security architecture that complies with at least one of the one or more user-based constraints.

14. The non-transitory computer readable medium of claim 12, wherein the one or more user-based constraints is to include one or more of a cost constraint, a time constraint, a security based constraint or a goal constraint.

15. The non-transitory computer readable medium of claim 12, wherein the remote data is to include one or more of hardware specifications, costs of security implementations, time for security implementations, network threat data or webpage data.

16. The non-transitory computer readable medium of claim 12, wherein the input model and the output model are each a directed graph.

17. The non-transitory computer readable medium of claim 12, wherein the one or more processors are to:

receive an input data structure that corresponds to the input network security architecture;
conduct an automated analysis of the input network security architecture to identify one or more missing elements that are part of the input network security architecture and missing from the input data structure; and generate the input model from the input data structure and the automated analysis.

* * * * *

UNITED STATES PATENT AND TRADEMARK OFFICE
CERTIFICATE OF CORRECTION

PATENT NO. : 11,115,439 B2
APPLICATION NO. : 16/275953
DATED : September 7, 2021
INVENTOR(S) : Tarameshloo et al.

Page 1 of 1

It is certified that error appears in the above-identified patent and that said Letters Patent is hereby corrected as shown below:

In the Specification

At Column 7, Description of the Embodiments, Line number 9, delete "parry," and insert --party,-- therefor.

At Column 8, Description of the Embodiments, Line number 13, delete "3 rd" and insert --3rd-- therefor.

Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*